United States Patent [19]

Dawley et al.

[11] Patent Number: 5,230,412
[45] Date of Patent: Jul. 27, 1993

[54] DRIVE FOR ROTARY PRINTING MACHINES

[75] Inventors: Douglas J. Dawley, Sandhausen, Fed. Rep. of Germany; Brian J. Gentle, Rochester, N.H.

[73] Assignee: Heidelberg Harris GmbH, Heidelberg, Fed. Rep. of Germany

[21] Appl. No.: 774,069

[22] Filed: Oct. 9, 1991

[51] Int. Cl.⁵ .............................................. F16D 11/14
[52] U.S. Cl. ..................................... 192/67 R; 192/108
[58] Field of Search ............. 192/67 R, 108; 464/157

[56] References Cited

U.S. PATENT DOCUMENTS

| | | | |
|---|---|---|---|
| 1,120,253 | 12/1914 | Ten Eyck | 192/108 X |
| 1,854,829 | 4/1932 | Döring et al. | 192/67 R X |
| 1,880,983 | 10/1932 | Reis | 464/157 X |
| 3,603,436 | 9/1971 | Bartholomew | 192/108 X |
| 3,603,437 | 9/1971 | Spence | 192/108 X |
| 3,606,260 | 9/1971 | Rubin | 464/157 X |
| 4,566,566 | 1/1986 | Vuillet | 192/67 R X |
| 4,607,734 | 8/1986 | Watashi et al. | 192/67 R |

FOREIGN PATENT DOCUMENTS

| | | | |
|---|---|---|---|
| 1020695 | 2/1953 | France | 192/108 |
| 25644 | of 1902 | United Kingdom | 192/67 R |
| 122977 | 2/1919 | United Kingdom | 192/67 R |

Primary Examiner—Richard M. Lorence
Attorney, Agent, or Firm—Herbert L. Lerner; Laurence A. Greenberg

[57] ABSTRACT

A drive for a rotary printing machine including a clutch for coupling two transmissions in a given phase relationship, the clutch being formed of two clutch halves, respectively, and having mutual coupling devices disposed at respective end faces thereof and offset eccentrically from a longitudinal axis thereof, both of the coupling devices being formed with respective, mutually engageable centering surfaces disposed radially thereto, the centering surfaces being disengageable from one another out of a coupled state, wherein the centering surfaces are mutually engaged, and into an uncoupled state, wherein a failsafe disconnection of the centering surfaces exists and the two transmissions are completely separated from one another.

2 Claims, 2 Drawing Sheets

DRIVE FOR ROTARY PRINTING MACHINES

The invention relates to a drive for rotary printing machines having a clutch for interengaging or coupling gears or transmissions in a predetermined phase position.

German Patent 28 54 032 discloses a driving device for rotary printing machines with which an additional gear is provided for the purpose of effecting coupling or interengagement in a predetermined phase position. A toothed disk is used for the coupling or interengagement per se and is controlled via a magnetic clutch and engageable in many positions. This heretofore known construction is not failsafe and requires a considerable expenditure with respect to construction and finances and thus greatly increases the cost of the drive.

It is accordingly an object of the invention to provide a drive for rotary printing machines having a failsafe clutch by which in-phase coupling and precise power transmission are assured in a relatively simple manner.

With the foregoing and other objects in view, there is provided, a drive for a rotary printing machine comprising a clutch for coupling two transmissions in a given phase relationship, the clutch being formed of two clutch halves, respectively, and having mutual coupling means disposed at respective end faces thereof and offset eccentrically from a longitudinal axis thereof, both of the coupling means being formed with respective, mutually engageable centering surfaces disposed radially thereto, the centering surfaces being disengageable from one another out of coupled state, wherein the centering surfaces are mutually engaged, and into an uncoupled state, wherein a failsafe disconnection of the centering surfaces exists and the two transmissions are completely separated from one another.

A clutch having the aforedescribed construction in accordance with the invention requires little manufacturing expenditure and ensures a high coupling precision. This clutch affords in-phase coupling via simple position indicators and adjusting means, so that in an engaged or coupled state, driving power is able to be transmitted with a highly precise rotational concentricity.

In accordance with another feature of the invention, the coupling means of one of the clutch halves comprise a cross-piece disposed thereon eccentrically to the longitudinal axis, and the coupling means of the other of the clutch halves are a slot formed in the other clutch half and matching the cross-piece, and wherein the centering surface on the one clutch half is formed on a tapered centering bushing, and the centering surface on the other clutch half is a defining surface of a tapered centering bore formed in the other clutch half.

A drive having a clutch of such construction permits the transmission of high driving power with very precise rotational concentricity.

Other features which are considered as characteristic for the invention are set forth in the appended claims.

Although the invention is illustrated and described herein as embodied in a drive for rotary printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
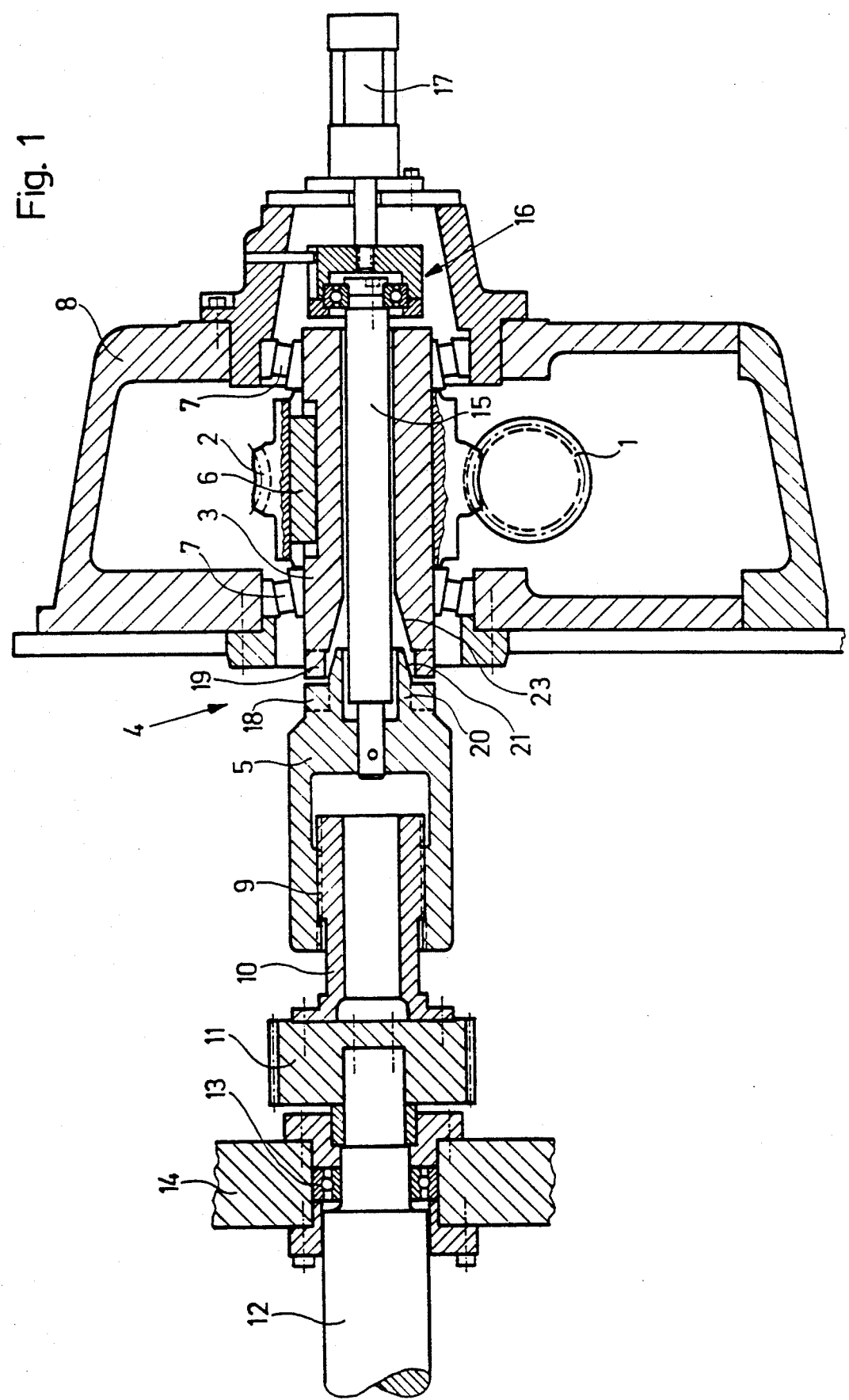
FIG. 1 is a longitudinal sectional view of a drive incorporating the invention of the instant application.

Referring now to the drawing and, first, particularly to FIG. 1 thereof, there is shown therein a drive for rotary printing machines by which driving power is transmitted to a clutch half 3 of a full clutch 4 via two cooperating worm wheels or gears 1 and 2. The other clutch half 5 is shown in uncoupled or disengaged condition in FIG. 1. The one clutch half 3 is connected to the worm gear 2 and supported by roller bearings 7 in a casing 8.

The other clutch half 5 is axially slideably supported, for example, by a sliding key connection 9 on a bushing 10. In the illustrated embodiment, the bushing 10 is fastened to a gear 11 which is mounted on a shaft journal or king pin 12 of a cylinder which is, in turn, supported by ball bearings 13 in a frame part 14.

For the purpose of engaging and disengaging the clutch 4, the clutch half 5 is axially shifted on the sliding key connection 9 via a pin 15, a turning connection 16 and adjusting means 17. Both clutch halves 3 and 5 can thus be connected to non-illustrated conventional angular pulse generators or rotary position indicators by means of which engagement of the clutch 4 can be effected at a given instant of time, if this should become necessary for the operation of the machine.

Figure 2:
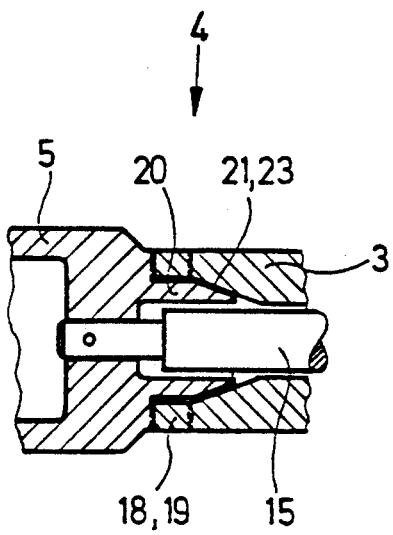
FIG. 2 is a fragmentary view of FIG. 1 showing the clutch according to the invention.

In FIG. 2, both halves 3 and 5 of the clutch 4 are shown in coupled or engaged condition.

Figure 3:
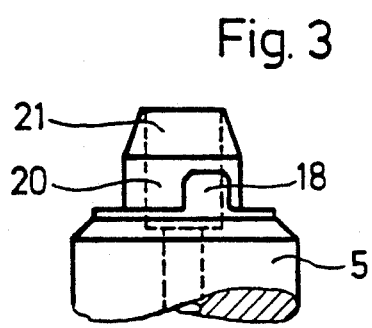
FIG. 3 is a fragmentary elevational view of FIG. 2 showing one clutch half rotated through 90° counterclockwise.
Figure 5:
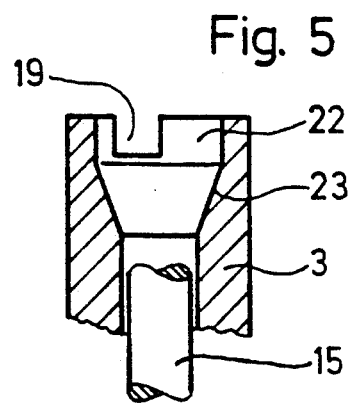
FIG. 5 is a fragmentary view of FIG. 2 showing the other clutch half thereof rotated clockwise through 90°.
Figure 4:
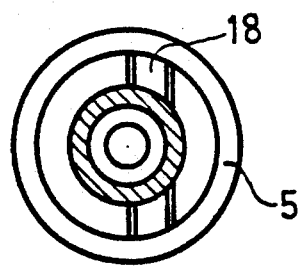
FIG. 4 is a top plan view, partly in section, of FIG. 3.
Figure 6:
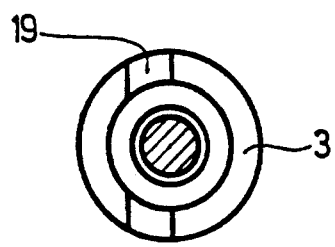
FIG. 6 is a top plan view of FIG. 5.

FIG. 3 shows the one clutch half 5 with an eccentrically offset cross-piece 18. The cross-piece 18 is located on the end face of the one clutch half 5 and fits into a corresponding slot 19 formed in the other clutch half 3 (FIGS. 5 and 6). Due to the eccentric arrangement of the cross-piece 18 and the slot 19, assurance is provided that both clutch halves 3 and 5 can be engaged only in a predetermined position.

In addition to the coupling means provided on the end faces of both clutch halves 3 and 5, a centering bushing 20 having a tapered or conical centering surface 21 is also provided on the one clutch half 5. The other clutch half 3 is, in turn, provided with a matching centering bore 22 having a tapered or conical centering surface 23 cooperating with the centering surface 21 of the centering bushing 20 so that, in engaged condition, both clutch halves 3 and 5 are centered with respect to one another. Thus, this clutch according to the invention enables a precise coupling or engagement in only one angular position of the clutch halves 3 and 5, and ensures play-free and vibrationless power transmission due to the precise centering of both clutch halves 3 and 5 in the engaged condition thereof. Furthermore, this clutch provides for a failsafe disengagement of the clutch halves 3 and 5.

I claim:

1. Drive for a rotary printing machine comprising a clutch for coupling two transmissions in a given phase relationship, said clutch being formed of two clutch halves, respectively, and having mutual coupling means disposed at respective end faces thereof and offset eccentrically from a longitudinal axis thereof, both of said coupling means being formed with respective, mutually engageable centering surfaces disposed radially thereto, said centering surfaces being disengageable from one another out of a coupled state, wherein said centering surfaces are mutually engaged, and into an uncoupled state, wherein a failsafe disconnection of said centering surfaces exists and the two transmissions are completely separated from one another, said coupling means of one of said clutch halves comprising a cross-piece disposed thereon eccentrically to said longitudinal axis, and said coupling means of the other of said clutch halves comprising a slot formed in said other clutch half and matching said cross-piece, and wherein said centering surface on said one clutch half is formed on a tapered centering bushing, and said centering surface on said other clutch half is a defining surface of a tapered centering bore formed in said other clutch half, only a single crosspiece being disposed on said one clutch half, and only a single slot being formed in said other clutch half, said single cross-piece being engageable in said slot for coupling the two transmissions in only a single rotary phase position thereof.

2. Drive for a rotary printing machine comprising a clutch for coupling two transmissions in a given phase relationship, said clutch being formed of two clutch halves, respectively, and having mutual coupling means disposed at respective end faces thereof and offset eccentrically from a longitudinal axis thereof, both of said coupling means being formed with respective, mutually engageable centering surfaces disposed radially thereto, said centering surfaces being disengageable from one another out of a coupled state, wherein said centering surfaces are mutually engaged, and into an uncoupled state, wherein a failsafe disconnection of said centering surfaces exists and the two transmissions are completely separated from one another, said coupling means of one of said clutch halves comprising a plurality of extensions disposed thereon eccentrically to said longitudinal axis, and said coupling means of the other of said clutch halves comprising matching recesses corresponding in number to said plurality of extensions, said centering surface on said one clutch half being formed on a tapered centering bushing, and said centering surface on said other clutch half being a defining surface of a tapered centering bore formed in said other clutch half, said plurality of extensions being exclusively engageable in said matching recesses corresponding in number thereto for coupling the two transmissions in only a single rotary phase position thereof.

* * * * *